(12) United States Patent
Hewitt

(10) Patent No.: US 9,051,187 B2
(45) Date of Patent: Jun. 9, 2015

(54) AGGLOMERATED ALUMINA CONTAINING PRODUCT

(75) Inventor: Samuel Hewitt, Vanderbijlpark (ZA)

(73) Assignee: Bumatech (PTY) Limited, Port Elizabeth (ZA)

( * ) Notice: Subject to any disclaimer, the term of this patent is extended or adjusted under 35 U.S.C. 154(b) by 24 days.

(21) Appl. No.: 13/575,802

(22) PCT Filed: Jan. 26, 2011

(86) PCT No.: PCT/IB2011/050338
§ 371 (c)(1),
(2), (4) Date: Aug. 6, 2012

(87) PCT Pub. No.: WO2011/092632
PCT Pub. Date: Aug. 4, 2011

(65) Prior Publication Data
US 2012/0297926 A1 Nov. 29, 2012

(30) Foreign Application Priority Data
Jan. 27, 2010 (ZA) ................. 2010/00620

(51) Int. Cl.
| | | |
|---|---|---|
| *C21C 7/076* | (2006.01) | |
| *C22B 1/14* | (2006.01) | |
| *C22B 7/00* | (2006.01) | |
| *C01C 1/02* | (2006.01) | |
| *C01F 7/02* | (2006.01) | |
| *C01F 7/42* | (2006.01) | |
| *C04B 33/02* | (2006.01) | |
| *C04B 33/132* | (2006.01) | |
| *C04B 33/138* | (2006.01) | |
| *C04B 33/32* | (2006.01) | |
| *C04B 35/117* | (2006.01) | |
| *C04B 35/626* | (2006.01) | |

(52) U.S. Cl.
CPC ................. *C01C 1/026* (2013.01); *C21C 7/076* (2013.01); *C22B 7/00* (2013.01); *C22B 1/14* (2013.01); *C01F 7/02* (2013.01); *C01F 7/025* (2013.01); *C01F 7/42* (2013.01); *C01P 2004/50* (2013.01); *C04B 33/025* (2013.01); *C04B 33/1328* (2013.01); *C04B 33/138* (2013.01); *C04B 33/32* (2013.01); *C04B 35/117* (2013.01); *C04B 35/62695* (2013.01); *C04B 2235/3201* (2013.01); *C04B 2235/3206* (2013.01); *C04B 2235/3208* (2013.01); *C04B 2235/3217* (2013.01); *C04B 2235/3218* (2013.01); *C04B 2235/322* (2013.01); *C04B 2235/3232* (2013.01); *C04B 2235/3239* (2013.01); *C04B 2235/3241* (2013.01); *C04B 2235/3262* (2013.01); *C04B 2235/3272* (2013.01); *C04B 2235/3418* (2013.01); *C04B 2235/3454* (2013.01); *C04B 2235/3463* (2013.01); *C04B 2235/3865* (2013.01); *C04B 2235/402* (2013.01); *C04B 2235/444* (2013.01); *C04B 2235/447* (2013.01); *C04B 2235/5427* (2013.01); *C04B 2235/606* (2013.01); *C04B 2235/72* (2013.01); *C04B 2235/726* (2013.01); *C04B 2235/80* (2013.01)

(58) Field of Classification Search
CPC ........... C01F 7/025; C01F 7/02; C01C 7/025; C01C 1/026
USPC .............................. 75/770, 765; 423/352, 353
See application file for complete search history.

(56) References Cited

U.S. PATENT DOCUMENTS

| | | | | |
|---|---|---|---|---|
| 2,480,901 A | * | 9/1949 | Bowden et al. | 75/773 |
| 4,523,949 A | * | 6/1985 | Gower et al. | 423/130 |
| 6,602,316 B1 | * | 8/2003 | Leshchinsky et al. | 75/313 |

FOREIGN PATENT DOCUMENTS

| | | | |
|---|---|---|---|
| DE | 10326611 | * | 12/2004 |
| DE | 10326611 A1 | | 12/2004 |
| JP | 63302932 | * | 12/1988 |
| JP | 2009013227 A | * | 1/2009 |
| WO | WO-91/09978 A1 | | 7/1991 |
| WO | WO-01/14605 A1 | | 3/2001 |

OTHER PUBLICATIONS

Derwent Acc No. 2009-E08387 for patent family JP 2009-031227 A by Koto et al published Jan. 22, 2009.*
Machine translation of DE 10326611 AI published Dec. 2004.*
International Search Report in International Application No. PCT/IB2011/050338, filed Jan. 26, 2011.

* cited by examiner

*Primary Examiner* — George Wyszomierski
*Assistant Examiner* — Tima M McGuthry Banks
(74) *Attorney, Agent, or Firm* — Saliwanchik, Lloyd & Eisenschenk

(57) ABSTRACT

The invention relates to a method for producing an agglomerated product containing alumina which is useful as a component to be incorporated into a synthetic slag as used in steel making. The product is formed from powdered aluminium dross which is formed with water into pellets or briquettes and wherein the components of the pellets or briquettes are allowed to react at elevated pressure to release ammonia. The pellets or briquettes may then be calcined.

16 Claims, No Drawings

AGGLOMERATED ALUMINA CONTAINING PRODUCT

CROSS-REFERENCE TO RELATED APPLICATIONS

This application is the U.S. national stage application of International Patent Application No. PCT/IB2011/050338, filed Jan. 26, 2011, which claims priority to South African Application No. 2010/00620, filed Jan. 27, 2010, the disclosures of each of which are incorporated herein by reference in their entirety.

FIELD OF THE INVENTION

This invention relates to a method for converting powdery aluminium dross into an agglomerated alumina containing product which is useful as a component of a synthetic slag for use in steel making.

BACKGROUND TO THE INVENTION

The steel industry uses synthetic slags in secondary steel making. The roles of synthetic slags are varied and include inclusion engineering, desulphurisation and heat transfer during ladle re-heating.

Different synthetic slag compositions are used for different purposes. Alumina ($Al_2O_3$), lime (CaO) and sometimes MgO and other minor components are examples of components of such synthetic slag compositions. The nature and quantity of such components of the ultimate synthetic slag compositions used in steel making are determined by the steel maker and are not in itself aspects of the present invention. The present invention is concerned with the alumina component to be introduced, if required, into such synthetic slag compositions. Alumina is added to lower the melting point of the synthetic slag thus making it more fluid at working temperature. An alumina containing product which is to be used as a component of a flux in such steel making process needs to be of a particulate nature having a size distribution of larger than about 3 mm and smaller than about 60 mm in cross dimension. This constraint is general because of the nature of furnace designs and dynamics which precludes the use of finer or powdery products.

This invention relates to the use of a waste product, namely powdery aluminium dross derived from aluminium smelters, as a raw material for producing an agglomerated product containing alumina which may be used as a component of the slags of the type in issue. Powdery alumina dross is the final waste after all recoverable aluminium metal has been removed from a dross originating from an aluminium smelting furnace. In the recovery of residual aluminium metal from aluminium dross originating from an aluminium furnace a milling process is conventionally used to reduce the hardened dross to a powder. The powdered dross is then passed through screens and filters and aluminium metal is recovered from the screens and filters while the product passing through the screens or filters, known as powdery aluminium dross, is treated as waste material. Large tonnages of this waste material end up in waste dumps. Some of the dross so produced during recovery of aluminium from dross is however also offered for sale by aluminium recovery operations. The dross so offered for sale is typically offered in different grades of fineness originating from the different screening and filtering operations. Thus so-called "coarse dross" typically has a particle size distribution of less than 1mm in maximum cross dimension. "Fine dross" or "Filter dross" having a particle size of typically less than 200 μm is another available product.

The major component of powdery aluminium dross is alumina ($Al_2O_3$) which typically account for between 30% and 60% of the mass of the dross. The powdery aluminium dross also typically contains aluminium metal. Despite the efforts to recover as much as possible of the aluminium content of the powdered slag, it may typically contain between about 1% and about 10% aluminium metal ($Al_m$) by mass. The powdered aluminium dross further typically contains aluminium values in the form of aluminium nitride (AlN) which is typically present in the dross in a quantity accounting for about 12% to about 30% of the mass of the dross. It has been established that the finer dross products generally have lower $Al_{(m)}$ content than the coarser dross products.

Other components which are typically present in powdery aluminium dross, and the quantities in which they are present, if present, are as follows:
$Fe_2O_3$—up to 1.0%
MnO—up to 0.2%
$Cr_2O_3$—up to 0.02%
$V_2O_5$—up to 0.15%
$TiO_2$—up to 0.2%
CaO—up to 1.5%
$K_2O$—up to 0.7%
S—up to 0.2%
$P_2O_5$—up to 0.3%
$SiO_2$—up to 5%
MgO—up to 5%

In the applicant's patent application WO 2009/004565 it was disclosed that the alumina present in powdery aluminium dross may be utilised as a source of alumina for a desulphurising flux in the steel making industry by forming the powdery aluminium dross into an agglomerated product in the form of pellets or briquettes with the aid of a binder material, namely cement, and in particular a high alumina cement. In the method disclosed in WO 2009/004565 the powdery dross is mixed with the cement and water and agglomerated into pellets or briquettes which were spread open to the atmosphere and allowed to dry, and then calcined by a self-sustaining combustion of the pellets or briquettes in a vertical kiln.

The applicant has now found a method whereby an agglomerated alumina containing product may be produced from powdery aluminium dross without the need to introduce a binder, thereby avoiding the introduction of extraneous elements and components which elements or components are not required to be present in the flux composition when the alumina containing product is used as a component of a synthetic slag in steel making.

OBJECT OF THE PRESENT INVENTION

It is an object of the present invention to provide a method for producing an agglomerated alumina containing product from a powdery aluminium dross which product is useful as a component of a synthetic slag composition used in steel making.

SUMMARY OF THE INVENTION

According to the present invention there is provided a process for converting powdery aluminium dross into an agglomerated alumina containing product comprising the steps of:
a) providing a powdery aluminium dross which contains aluminium values in the form of $Al_2O_3$, AlN and $Al_{(m)}$;

b) wetting the powdery aluminium dross by mixing it with water to obtain a mouldable wetted aluminium dross mixture;

c) forming the wetted aluminium dross mixture into an agglomerated pellets or briquettes;

d) introducing the agglomerated pellets or briquettes formed from the wetted aluminium dross mixture into a pressure vessel;

e) allowing a spontaneous exothermic reaction between the components of the pellets or briquettes formed from the wetted aluminium dross mixture to occur at an elevated pressure and temperature during which reaction ammonia gas is formed;

f) allowing the agglomerated pellets or briquettes to be partially dried to acquire sufficient strength to allow it to be removed from the pressure vessel;

g) removing the partially dried pellets or briquettes from the pressure vessel; and h) optionally collecting the ammonia gas formed during the spontaneous exothermic reaction between the components of the wetted aluminium dross mixture.

In one application of the invention the partially dried agglomerated pellets or briquettes may be transferred to a kiln and calcined if the composition of the partially dried pellets or briquettes are suitable to be calcined.

Both the partially dried pellets or briquettes, and the calcined pellets or briquettes, on removal from the pressure vessel or kiln, as the case may be, are suitable for use as a component of a synthetic slag for use in steel making.

The powdery aluminium dross used in the process of the invention may originate from the dross formed in aluminium smelter which dross has been milled or otherwise reduced to a powder for the purpose of recovering aluminium from the dross produced during the smelting process. Preferably however the dross originates from a primary aluminium smelter or from a secondary smelter which does not use any salts for fluxing purposes. If the end use to which the agglomerated alumina containing product is to be put is not sensitive to the presence of salts conventionally used during secondary aluminium smelting, then the powdery aluminium dross used in the process of the invention may alternatively also originate from such secondary aluminium smelters.

The powdery aluminium dross used in the process of the invention preferably has a particle size distribution of less than 1 mm in maximum cross sectional dimension of the particles. In a preferred form of the invention less than 30% by mass, and most preferably less than 20% by mass of the powdery aluminium dross has a maximum cross sectional dimension of less than 200 μm, the balance having cross sectional dimensions of between 200 μm and 1 mm.

The powdery aluminium dross used in the process of the invention is predominantly composed of residual aluminium metal, aluminium nitride (AlN) and alumina ($Al_2O_3$). The powdery aluminium dross thus preferably contains between about 30% and about 60% alumina, between about 12% and about 30% AlN and between about 1% and about 10% aluminium metal. In one preferred form of the invention the powdery aluminium dross used in the process of the invention contains at least 2.0% aluminium metal. Thus, when all aluminium values in the powdery aluminium dross is expressed as $Al_2O_3$ the alumina content of the powdery aluminium dross may typically be between 70% and 110%. In the preferred form of the invention the composition of the alumina in the dross is larger than 80% aluminium (expressed as $Al_2O_3$).

Typical other components of the powdery aluminium dross are as follows:

$Fe_2O_3$—up to 1.0%
MnO—up to 0.2%
$Cr_2O_3$—up to 0.02%
$V_2O_5$—up to 0.15%
$TiO_2$—up to 0.2%
CaO—up to 1.5%
$K_2O$—up to 0.7%
S—up to 0.2%
$P_2O_5$—up to 0.3%
$SiO_2$—up to 5%
MgO—up to 5%
Na as $Na_2O$—up to 5%

Further according to the present invention the agglomerated pellet or briquette product is formed to have a size distribution of between 3 mm and 60 mm in maximum cross dimension.

The agglomerated pellet or briquette product may preferably have a size distribution of between 3 mm and 40 mm in maximum cross dimension.

The step of forming the wetted aluminium dross mixture into agglomerated pellets or briquettes may comprise any suitable method to achieve that objective. Preferably the step comprises a pelletising process utilizing a pelletising pan. Likewise, any suitable briquetting equipment may be used for forming the wetted aluminium dross mixture into briquettes, if that form of the product is preferred.

The reaction in the pressure vessel between the components of the pellets or briquettes formed from the wetted aluminium dross mixture is preferably carried out at a pressure of between 10 and 30 kPa (gauge pressure). This pressure may be achieved by using a pressure vessel fitted with a gas withdrawal conduit of which the discharge end is located in a reaction vessel which is open to atmospheric pressure and which contains a suitable liquid and locating the discharge end of the gas withdrawal conduit at a sufficient depth below the liquid surface in the reaction vessel to have a head of liquid between the discharge end of the gas withdrawal conduit and the surface of the liquid, which head of liquid corresponds to the required pressure in the pressure vessel. The ammonia gas formed during the reaction between the components of the pellets or briquettes formed from the wetted aluminium dross mixture is thus bubbled through the liquid in the reaction vessel. In a preferred form of this embodiment of the invention the process is run by introducing a sufficient volume of liquid into the reaction vessel to have a head of liquid above the discharge end of the gas withdrawal conduit to give rise to a pressure of about 10 kPa in the pressure vessel when the spontaneous reaction between the components of the pellets or briquettes formed from the wetted aluminium dross mixture is under way, and periodically adding more liquid to the reaction vessel the pressure thereby to cause the pressure to increase to 30 kPa.

In one form of this aspect of the invention the liquid in the reaction vessel may be water whereby the ammonia gas is recovered as an ammonia solution by bubbling it through the water in the reaction vessel. Alternatively the liquid in the reaction vessel may be diluted sulphuric acid whereby the ammonia gas is caused to react with the sulphuric acid to produce a solution of ammonium sulphate by bubbling it through the diluted sulphuric acid in the reaction vessel. When producing an ammonium sulphate solution in this manner it is preferred to aim to achieve a 38% ammonium sulphate solution before the reaction vessel is drained and charged afresh with diluted sulphuric acid. This step may be controlled by monitoring either the pH or the density of the solution in the reaction vessel and adding more sulphuric acid as it is consumed during the reaction with the ammonia introduced into the reaction vessel.

The spontaneous reaction between the components of the pellets or briquettes formed from the wetted aluminium dross mixture is an exothermic reaction and it has not been found to be necessary to control the temperature at which the reaction proceeds. The heat generated during this reaction also serves to drive water from the formed pellets or briquettes and hence to at least partially dry the formed pellets or briquetted and to increase the mechanical green strength of the pellets or briquettes.

While not wishing to be bound by theory it would appear that the spontaneous exothermic reaction between the components of the pellets or briquettes formed from the wetted aluminium dross mixture which takes place in the pressure vessel is, or at least includes a reaction between the AlN in the powdery aluminium dross and water whereby ammonia and $Al(OH)_3$ and $AlO(OH)$ are formed with the release of energy in the form of heat. The released heat serves to partially dry the pellets or briquettes and possibly also has other physico or physico-chemical effects which serves to increase the green strength of the pellets or briquettes formed from the wetted aluminium dross mixture.

Such pellets or briquettes may be removed from the pressure vessel when the reaction has proceeded to completion or near completion. The pellets or briquettes so produced are herein referred to a partially dried pellets or briquettes.

The method of the present invention further includes the optional further step of reducing the aluminium metal content of the partially dried pellets or briquettes by calcining the agglomerated product in a kiln in a manner as conventionally used for calcining various products.

In this regard it has been found that the partially dried pellets or briquettes is combustible by the self-sustaining combustion thereof. It is accordingly a further feature of the present invention to convert the partially dried pellets or briquettes into a substantially non-smoke generating product with a low mass loss on ignition by setting the agglomerated product alight and burning the agglomerated product. This step is preferably carried out in a vertical kiln by introducing the partially dried pellets or briquettes into a vertical kiln, setting alight the agglomerated pellets or briquettes in the vertical kiln by igniting the pellets or briquettes at or near the lower end of the kiln and allowing a self sustaining combustion of the pellets to proceed upwardly through the kiln and removing the calcined pellets or briquettes from the lower end of the vertical kiln and replenishing the charge of the kiln with partially dried pellets or briquettes at the upper end of the vertical kiln.

Again without wishing to be bound by theory it would appear that the self sustaining combustion of the partially dried pellets or briquettes may be attributed to the oxidation during combustion of the residual aluminium metal in the partially dried pellets or briquettes which provides the heat for the combustion, during which reaction the aluminium metal is converted to alumina.

According to a further aspect of the invention there is provided for the use of calcined or uncalcined agglomerated pellets or briquettes produced from powdery alumina dross by the process as described above as a source of alumina in a synthetic slag for use in steel making.

Again, the use of the calcined agglomerated product may preferably be of a product which has a size distribution of between 3 mm and 60 mm in maximum cross dimension.

The agglomerated product may again further preferably be a pelletised product.

The invention further provides for an agglomerated product in the form of pellets or briquettes for use as a source of alumina in a synthetic slag used in steel making which agglomerated product predominantly contains alumina, AlN and boehmite.

In addition the invention provides for a product in the form of pellets or briquettes for use as a source of alumina in a synthetic slag used in steel making which agglomerated product contains the following aluminium compounds in the Wt % as indicated as determined by means of X-ray diffraction analysis during which the phase concentrations were determined by Rietveld quantitative analysis using DIFFRAC-plus TOPAS software:

35% to 55% alumina in the form of the corundum,
10% to 30% AlN,
4% to 11% boehmite,
2% to 6% gibbsite
2% to 8% brownmillerite,
2% to 8% diayudaoite,
2% to 6% aluminium metal, and
1% to 4% andalusite.

It has been found that the boehmite content in the briquettes produced by the invention is present in a significantly higher quantity than in the powdery alumina dross from which the agglomerated product is produced and presumably act as the binder for the agglomerated product. The invention thus also provides for an agglomerated product in the form of pellets or briquettes for use as a source of alumina in a synthetic slag used in steel making which agglomerated product is produced from a powdery alumina dross and which is characterised in that it contains a higher Wt % boehmite than the powdery alumina dross from which it is produced.

EXAMPLES OF THE INVENTION

Examples of the present invention will now be described without thereby limiting the scope of the invention to the illustrative embodiments.

Example 1

Preparation of Agglomerated Pellets 1200 kg of coarse powdery aluminium dross and 300 kg fine powdery aluminium dross received in bulk bags from aluminium recovery operations were weighed out and thoroughly blended. These quantities are determined to aid the formation of pellets during the pelletising process. The mixture was placed on a circulating pelletising pan. Water was added to the pan by means of a spray bar. The water addition was adjusted by means of a valve until pellets were formed in the pan. The formed pellets discharged automatically onto a conveying system when the pellet size reached 3 mm.

The formed pellets were transferred to pressure vessel fitted with a gas withdrawal conduit of which the discharge end was located in a reaction vessel which is open to atmospheric pressure and which contained diluted sulphuric acid (10% sulphuric acid in water) to a depth such that the discharge end of the gas withdrawal conduit was located at a depth of about 150 cm below the liquid surface, to have a head of diluted sulphuric acid between the discharge end of the conduit and the surface of the liquid which head of liquid causes a pressure of 15 kPa to develop in the pressure vessel before the ammonia gas which is discharged as a result of the reaction in the pressure vessel starts bubbling through the diluted sulphuric acid in the reaction vessel. More sulphuric acid is periodically added to the reaction vessel as the reaction between the sulphuric acid and ammonia proceeds until the head of liquid in the reaction vessel increases to an extent that the pressure in the pressure vessel increases to 30 kPa. When the concentration of the ammonium sulphate solution formed in the reaction vessel increased to about 38% the reaction vessel is drained and recharged with fresh diluted sulphuric acid.

The reaction in the pressure vessel has been observed to commence spontaneously within about 30-60 minutes of the formed pellets being introduced. When this reaction has run to completion or near completion as indicated by the absence or near absence of ammonia gas being produced, the partially dried pellets are removed from the pressure vessel and transferred to a vertical kiln.

Example 2

Preparation of Calcined Agglomerated Pellets

The partially dried pellets produced according to Example 1 were loosely packed into the vertical kiln providing a lower end with a steel grid or mesh and an open upper end. The pellets at the lower end of the stack were then set alight or heated at the lower end of the stack. The heat source was applied only initially until self-sustaining combustion took place. As the self-sustaining combustion of the product progressed upwardly through the stack the pellets were calcined and converted into a pelletised product with a much lower mass loss on ignition and hydroxide than the pellets before the combustion or calcining.

The vertical kiln was provided with a discharge mechanism towards the lower end thereof whereby the pellets at the lower part of the kiln, which has already been calcined, may be discharged, allowing the reaction zone in the kiln to drop. New uncalcined or partially dried pellets can then be added into the top of the kiln allowing the reaction to progress upwards into the new pellets. This allows for a continuous operation in one structure with no energy requirements after the initial ingnition.

It has also been found that a permeable bottom part of the kiln used for calcining allows for improved airflow into the structure to provide the necessary oxygen for the oxidation reactions.

The pellets removed from the kiln were left to cool. The cooled pellets were then ready for use. Satisfactory results were obtained when these pellets were used as a component to provide the required alumina for a synthetic slag in a steel making process.

Example 3

Preparation of Agglomerated Briquettes

Briquettes having a maximum cross sectional dimension of about 30 mm were produced in the same manner as described in Example 1 but using a standard briquetting machine as is known in the briquetting of fuel such as charcoal. The briquettes were not calcined. They were found to be suitable for use as the required alumina component of a synthetic slag for use in steel making in the form of the partially dried briquettes prepared as described above.

A major element analysis (wt %) and V (ppm) concentrations were determined by X-Ray Fluorescence Spectrometry (XRF) on fusion discs and pressed powder pellets in respect of the powdery aluminium dross mixture used to form the briquettes and on the briquettes as prepared in the pressure vessel. Mineralogical Data in respect of these two products were also obtained by X-Ray Diffraction analysis during which the phase concentrations were determined by Rietveld quantitative analysis using DIFFRAC-plus TOPAS software. The results of these procedures are set out respectively in Tables 1 and 2 below.

TABLE 1

X-Ray Fluorescence Spectrometry (XRF)

| | Sample | |
|---|---|---|
| Component | Powdery Aluminium Dross Mixture Wt % | Briquette Wt % |
| SiO2 | 4.81 | 3.24 |
| TiO2 | 0.16 | 0.22 |
| Al2O3 | 92.01 | 88.12 |
| Fe2O3(t) | 0.91 | 0.85 |
| MnO | 0.118 | 0.120 |
| MgO | 2.59 | 2.57 |
| CaO | 1.17 | 1.20 |
| Na2O | 2.29 | 2.08 |
| K2O | 0.33 | 0.22 |
| P2O5 | 0.152 | 0.149 |
| Cr2O3 | 0.073 | 0.069 |
| L.O.I. | −4.10 | 1.38 |
| Total | 100.52 | 100.22 |
| H2O— | 0.45 | 0.97 |
| V | 312 | 278 |

TABLE 2

X-Ray Diffraction analysis

| Component | Composition | Powdery Aluminium Dross Mixture Wt % | Briquette Wt % |
|---|---|---|---|
| Corundum | alpha-Al2O3 | 46.22 | 45.01 |
| Diaoyudaoite | beta-NaAl11O17/0.5 (Na2O•11Al2O3) | 2.66 | 2.72 |
| Gibbsite | Al(OH)3 | 3.5 | 3.53 |
| Aluminum Nitride | AlN | 27.2 | 19.78 |
| Andalusite | Al2(SiO4)O | 2.11 | 2.56 |
| Boehmite | AlOOH | 0.26 | 7.73 |
| Aluminium | Al | 2.83 | 3.39 |
| Halite | NaCl | 2.76 | 1.62 |
| Lime | CaO | 1.12 | 1.27 |
| Potassium Hydrogen Phosphate Hydrate | K3H2P3O10H2O | 2.48 | 2.84 |
| Hydrogen Phosphorus Nitride PN2H | PN2H | 0.772 | 0.521 |
| Quartz | SiO2 | 0.128 | 0.224 |
| Larnite (C2S beta (MUMME) | Ca2SiO4 | 2 | 3.3 |
| Brownmillerite (C4AF) | Ca2(Al,Fe + 3)2O5 | 5.93 | 5.49 |
| Total | | 99.97 | 99.99 |

Many variations of the invention may be devised without thereby departing from the spirit of the invention.

The invention claimed is:
1. A process for converting powdery aluminum dross into an agglomerated alumina containing product comprising:
   a) providing a powdery aluminum dross which contains aluminum values in the form of $Al_2O_3$, AlN, and $Al_{(m)}$;
   b) mixing the powdery aluminum dross with water to form a wetted aluminum dross mixture absent added binding material;

c) forming the wetted aluminum dross mixture into agglomerates;
d) introducing the agglomerates into a pressure vessel;
e) allowing a spontaneous exothermic reaction within the agglomerates to occur in a pressure vessel at an elevated pressure and temperature with the formation of ammonia gas;
f) allowing the agglomerates to be partially dried to form agglomerated pellets or briquettes;
g) removing the agglomerated pellets or briquettes from the pressure vessel; and
h) optionally, collecting the ammonia gas.

2. The process for converting powdery aluminum dross into an agglomerated alumina containing product according to claim 1, further comprising transferring the agglomerated pellets or briquettes to a kiln and igniting the agglomerated pellets or briquettes.

3. The process for converting powdery aluminum dross into an agglomerated alumina containing product according to claim 2, wherein the dross from a primary aluminum smelter or from a secondary smelter that does not use any salts for fluxing.

4. The process for converting powdery aluminum dross into an agglomerated alumina containing product according to claim 2, wherein the powdery aluminum dross has a particle size distribution of less than 1 mm in cross section.

5. The process for converting powdery aluminum dross into an agglomerated alumina containing product according to claim 2, wherein the powdery aluminum dross is predominantly composed of residual aluminum metal, aluminum nitride (AlN) and alumina ($Al_2O_3$).

6. The process for converting powdery aluminum dross into an agglomerated alumina containing product according to claim 2, wherein the agglomerated pellets or briquettes have a size distribution of between 3 mm and 60 mm in maximum cross dimension.

7. The process for converting powdery aluminum dross into an agglomerated alumina containing product according to claim 1, wherein providing the powdery aluminum dross comprises milling a dross from an aluminum smelter to the powdery aluminum dross.

8. The process for converting powdery aluminum dross into an agglomerated alumina containing product according to claim 7, wherein the aluminum smelter is a primary smelter or a secondary smelter, wherein the secondary smelter does not use salts for fluxing.

9. The process for converting powdery aluminum dross into an agglomerated alumina containing product according to claim 1, wherein the powdery aluminum dross has a particle size distribution of less than 1 mm in maximum cross sectional dimension.

10. The process for converting powdery aluminum dross into an agglomerated alumina containing product according to claim 1, wherein the powdery aluminum dross is predominantly composed of residual aluminum metal, aluminum nitride (AlN) and alumina ($Al_2O_3$).

11. The process according to claim 10, wherein the powdery aluminum dross contains between about 30 wt % and about 60 wt % alumina, between about 12 wt % and about 30 wt % AlN and between about 1 wt % and about 10 wt % aluminum metal.

12. The process according to claim 11 wherein other components of the powdery aluminum dross are:
$Fe_2O_3$—0 to 1.0 wt %
MnO—0 to 0.2 wt %
$Cr_2O_3$ —0 to 0.02 wt %
$V_2O_5$ —0 to 0.15 wt %
$TiO_2$—0 to 0.2 wt %
CaO—0 to 1.5 wt %
$K_2O$—0 to 0.7 wt %
S—0 to 0.2 wt %
$P_2O_5$—0 to 0.3 wt %
$SiO_2$—0 to 5 wt %
MgO—0 to 5 wt %
Na as $Na_2O$—0 to 5 wt %.

13. The process for converting powdery aluminum dross into an agglomerated alumina containing product according to claim 1, wherein the agglomerated pellet or briquette product is formed to have a size distribution of between 3 mm and 60 mm in maximum cross dimension.

14. The process for converting powdery aluminum dross into an agglomerated alumina containing product according to claim 1, wherein the elevated pressure in the pressure vessel is between 10 and 30 kPa.

15. The process for converting powdery aluminum dross into an agglomerated alumina containing product according to claim 1, wherein the pressure vessel is fitted with a gas withdrawal conduit of which a discharge end is located in a reaction vessel which is open to atmospheric pressure and which contains a suitable liquid and locating the discharge end of the gas withdrawal conduit at a depth below the liquid surface in the reaction vessel to have a head of liquid between the discharge end of the gas withdrawal conduit and the liquid surface, wherein the head of liquid controls the pressure in the pressure vessel.

16. A method of use for agglomerated pellets or briquettes produced from powdery alumina dross by the process according to claim 1, comprising providing the pellets or briquettes as a synthetic slag in steel making.

* * * * *